N. F. DAUMEYER.
DISH STAND.
APPLICATION FILED AUG. 9, 1909.
948,476.
Patented Feb. 8, 1910.
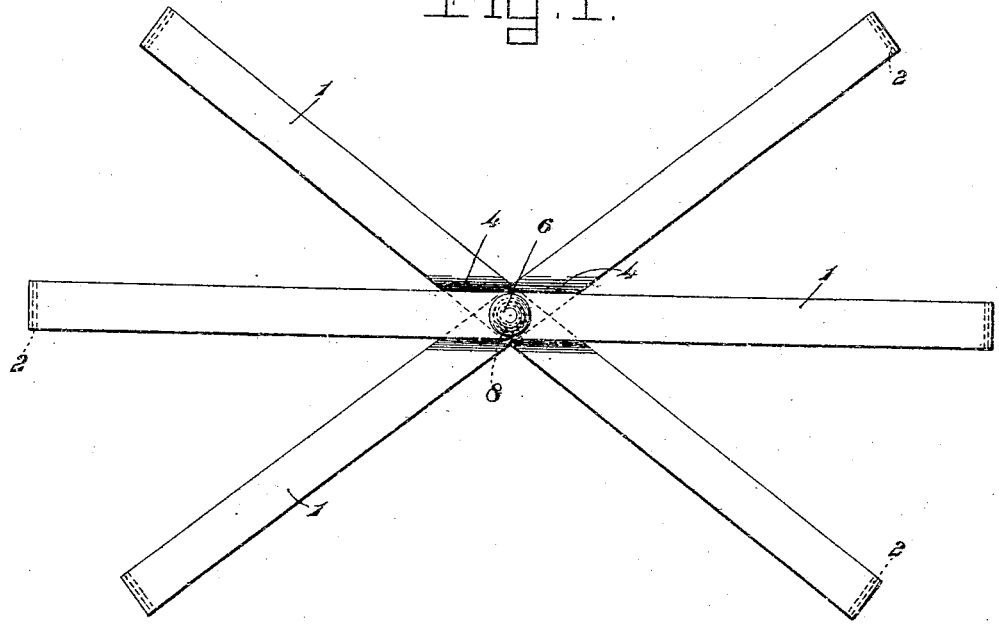
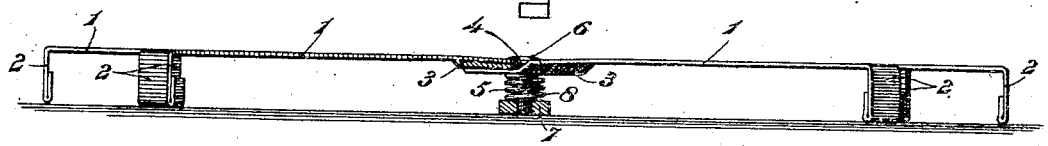
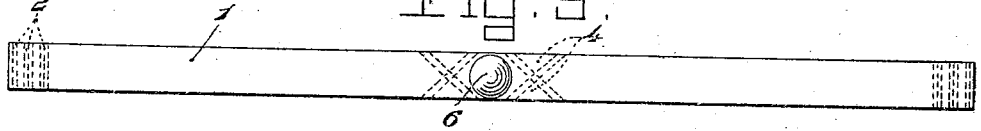
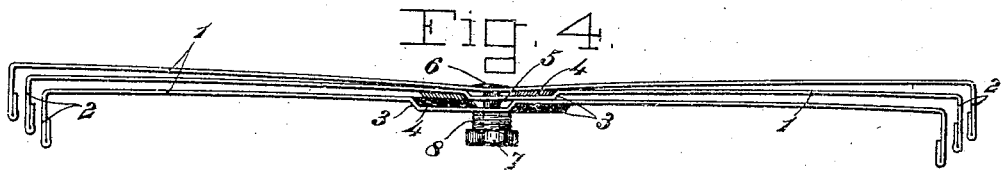
WITNESSES
INVENTOR
Nicholas F. Daumeyer
by Henry N. Copp
his Attorney

UNITED STATES PATENT OFFICE.

NICHOLAS F. DAUMEYER, OF NORWOOD, OHIO.

DISH-STAND.

948,476.  Specification of Letters Patent.  Patented Feb. 8, 1910.

Application filed August 9, 1909.  Serial No. 512,059.

*To all whom it may concern:*

Be it known that I, NICHOLAS F. DAUMEYER, a citizen of the United States, residing at Norwood, county of Hamilton and State of Ohio, have invented certain new and useful Improvements in Dish-Stands, of which the following is a specification.

My invention relates to dish stands.

The object of the present invention is the provision of a dish stand of simple, durable, and inexpensive construction, having its parts constructed and combined in a novel manner whereby the device may be readily opened out for use or folded into compact form when it is not needed, thus rendering the device adaptable for use by those who desire to carry about, while traveling, as a stand for holding hot dishes, tea and coffee pots, fern dishes or other articles, to prevent soiling of the table or linen.

The invention embraces certain novel features of construction and combinations of parts more fully set forth hereinafter.

In the accompanying drawings: Figure 1 is a plan view showing the stand extended; Fig. 2, a side elevation thereof; Fig. 3, a plan view of the stand when folded; and Fig. 4, a side view thereof.

The device consists of a plurality of thin metal arms 1 having bent ends 2 which constitute feet for supporting the arms above the surface on which the device rests. These arms and feet may be conveniently formed of ribbon metal or each cast in one piece.

Certain of the arms are provided with depressed parts 3 providing channels 4 which are disposed obliquely to the arms and one of the arms is adapted to lie in said channels when the device is extended, the depressed parts of the other arms being nested, so that the upper faces of the arms are flush when the device is in use and thus provide a level support for the dish or other article resting thereon. The arms are pivotally connected together by a member 5 which is provided with two heads 6 and 7 and is surrounded by a coil spring 8 whose purpose is to keep the arms interlocked when in extended position and held together when closed up. The member 5 is preferably a short bolt provided with a nut screw-threaded thereon and prick-punched so that it will not become detached.

Having thus described my invention, what I claim as new and desire to secure by Letters Patent, is:—

1. A folding stand for dishes and similar articles, comprising flat, straight members having a spring-actuated pivotal connection and one or more of them thereat being provided with a channel to receive the other when crossed, said members being adapted to be folded into superposed and alined arrangement.

2. A folding stand for dishes and similar articles, comprising three or more flat straight members having a spring-actuated pivotal connection, two of said members having oblique channels which are adapted to receive the other member when all of them are in crossed relation.

In testimony whereof, I hereunto affix my signature in presence of two witnesses.

NICHOLAS F. DAUMEYER.

Witnesses:
  OSCAR H. BROKER,
  W. W. SCHUELER.